Aug. 2, 1938.   J. N. H. CHRISTMAN   2,125,486
VEHICLE VENTILATING STRUCTURE
Filed Nov. 20, 1936
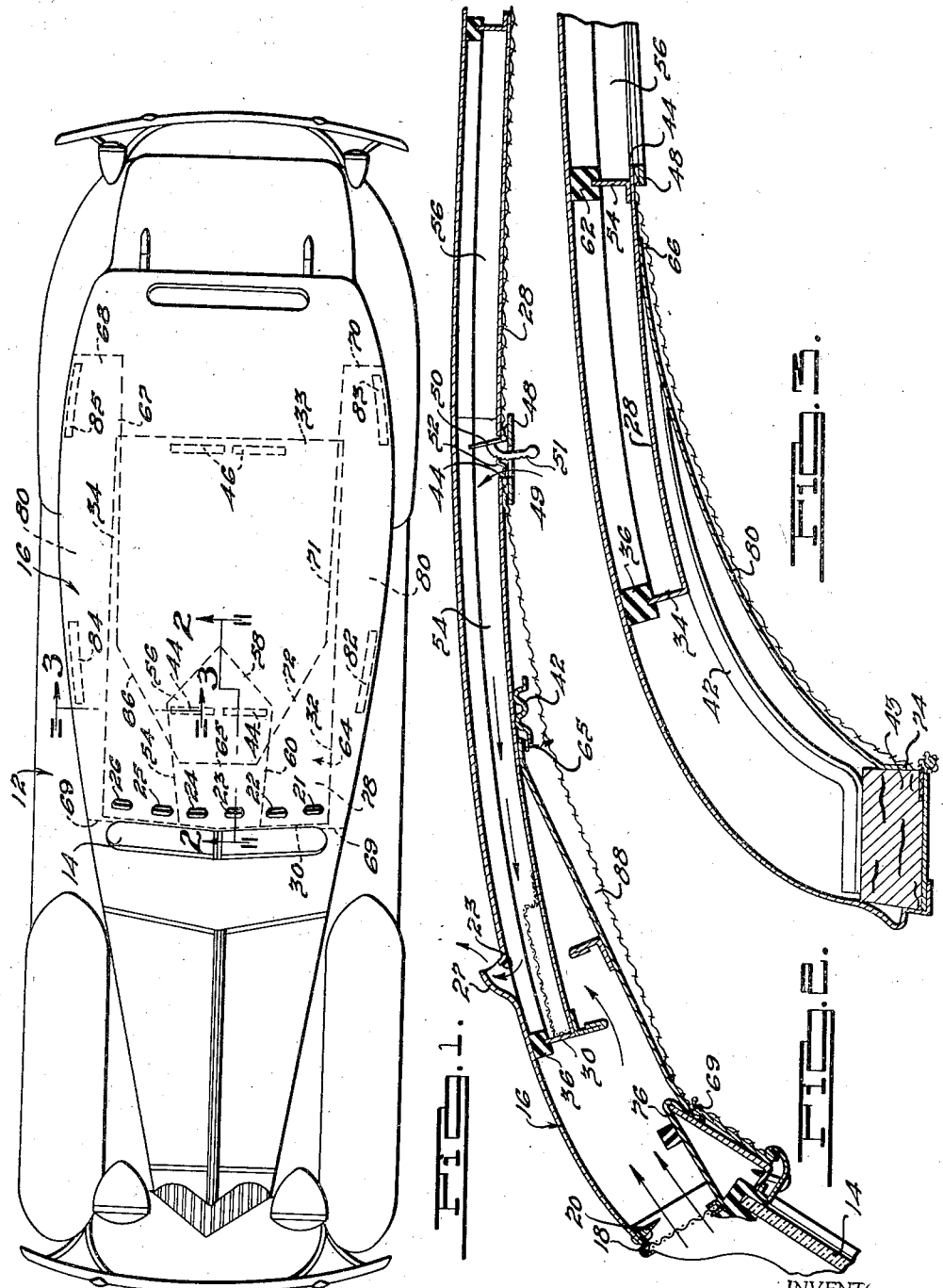
INVENTOR
John N. H. Christman
BY
Barnes, Dickey, Pierce & Hamm
ATTORNEYS.

Patented Aug. 2, 1938

2,125,486

UNITED STATES PATENT OFFICE 2,125,486

VEHICLE VENTILATING STRUCTURE

John N. H. Christman, Detroit, Mich., assignor to Evans Products Company, Detroit, Mich., a corporation of Delaware Application November 20, 1936, Serial No. 111,771

6 Claims. (Cl. 98—2)

This invention relates to vehicle body ventilating apparatus; and in particular relates to apparatus for ventilating the interior of closed passenger vehicles.

Objects of the invention are to provide improved ventilating structures by which air injected into the passenger compartment and ejected therefrom may be more effectively and efficiently distributed into and discharged from the passenger compartment; to provide a simplified ventilating structure which takes up a minimum of space and may conveniently be built into conventional types of vehicle bodies with a minimum of alteration; to provide a simplified structure for forming independent exhaust ducts in the roof structure of a vehicle by which the exhaustion of air from different portions of the passenger compartment may be effectively and independently controlled; and to provide a simplified and economical vehicle ventilating structure which is attractive in appearance.

Other objects of the invention will become apparent from the following specification, the drawing relating thereto, and from the claims hereinafter set forth.

In the drawing, in which like numerals are used to designate like parts in the several views throughout:

Figure 1 is a top plan view of a vehicle embodying features of the present invention;

Fig. 2 is a cross-sectional view taken substantially along the line 2—2 of Fig. 1; and Fig. 3 is a cross-sectional view taken substantially along the line 3—3 of Fig. 1.

The present invention relates to improvements over the structure shown in United States Letters Patent No. 1,969,934, granted August 14, 1934, to William Lintern and Alfred R. Lintern and the structure shown in United States Letters Patent No. 2,036,485 granted April 7, 1936, to William Lintern and Alfred R. Lintern. In the patents referred to, structures are disclosed in which air is injected into the body of a vehicle and ejected from the body for the purpose of maintaining the interior of a body in a properly ventilated condition.

Also, the present application is a companion case to the copending application of Alfred R. Lintern, Serial No. 111,786, filed November 20, 1936.

According to the present invention, an injector opening, or openings, is provided immediately above the windshield; and ejector openings are provided in the outer roof panel of the vehicle in a position above the windshield and adjacent the front of the vehicle top. Intake and exhaust chambers communicating with the injector and ejector openings respectively are formed in the vehicle roof in a simplified manner. The exhaust chamber is preferably formed by a sheet metal pan member which extends longitudinally of the vehicle substantially co-extensive with the upper roof portion in cooperation with the outer roof panel. A plurality of spaced openings in the pan member communicate the exhaust compartment with the interior of the vehicle body.

It has been found that when air is exhausted from a large space such as the passenger compartment of a closed vehicle that best results are obtained when independent exhaust ducts communicating with spaced portions of the passenger compartment are provided. According to the present invention, a plurality of central and end exhaust openings are provided in the roof panel and independent means are provided for communicating the central and end openings, respectively, with the interior of the passenger compartment.

Also, by providing means by which air is injected into the passenger compartment at spaced points corresponding substantially to the points at which the air is exhausted, effective ventilation of the passenger compartment is obtained.

For a better understanding of the invention, reference may be had to the accompanying drawing in which a preferred structure is illustrated, and in which in Fig. 1 a passenger automobile 12 of the closed type is illustrated embodying features of the present invention. The automobile 12 includes a conventional front windshield 14 and a conventional roof having a curved outer roof panel 16. The outer roof panel 16 extends forwardly of the front windshield adjacent the front edge 18 and is provided with a transverse opening 20, or openings, providing an injector or intake opening for air. The air as it passes upwardly over the windshield, is caught by the forwardly extending edge 18 of the outer roof panel and is caused to pass into the vehicle 20.

A plurality of ejector openings 21, 22, 23, 24, 25, and 26 are provided through the outer roof panel substantially in transverse alignment above the windshield and adjacent the forward edge of the roof panel. Louvres 27 are preferably provided over each of the openings. As disclosed in the above referred to patents and as disclosed in the United States Letters Patent No. 1,862,058, granted June 7, 1932 to William Lintern, the exhaust or ejector openings are located in such a position relative to the vehicle roof that a low pressure is created immediately above the opening, causing ejection of the air from the interior of the passenger vehicle.

In order to provide an exhaust compartment in communication with the exhaust openings a unitary pan member, which is preferably substantially rectangular in shape, is provided having a bottom 28 and upstanding sides 30, 32, 33, and 34. Elongated resilient members 36 have portions which embrace the upper edges of the side members and are adapted to resiliently engage the inner surface of the outer panel member 16 around the periphery of the pan member to provide a substantially air-tight seal for the exhaust compartment. The pan member extends longitudinally of the roof of the vehicle substantially co-extensive with the top portion of the roof; and the bottom and sides of the pan member are preferably curved complementary in shape to the curvature of the roof so that a sealed fit is effected without disturbing the conventional interior appearance of the body.

The pan member is preferably supported and held in place relative to the roof by means of a transversely extending corrugated bracket member 42 suitably secured to the longitudinally extending lintel members 43 at the sides of the vehicle. The pan member may be spot welded to the bracket member 42 or otherwise suitably secured thereto.

For communicating the exhaust compartment with the passenger compartment of the vehicle, forward openings 44 and rear openings 46 are provided through the bottom 28. The openings 44 are intermediate the ends of the pan member so that these openings communicate with the forward portion of the passenger compartment; and the openings 46 are located adjacent the rear of the pan member so that these openings communicate with the rear portion of the passenger compartment. Although in the specific embodiment shown, two openings are illustrated communicating with the front portion of the passenger compartment and two openings are illustrated communicating with the rear portion thereof, it is to be understood that this number of openings may be varied within the scope of the present invention and that the particular number shown is merely by way of illustration.

Grill members 48 are preferably provided over the openings 44 and 46, respectively, on the interior of the vehicle, the grill members 48 having openings 49 therethrough in alignment with the openings into the exhaust compartment for communicating the exhaust compartment with the passenger compartment. Suitable control means, such as a pivoted shutter member 50, having an arm projecting through the opening 49, are provided for adjustably controlling the flow of air through each of the openings. A spring means 52 is provided for resilient engagement with the arm 51 for adjustably holding the shutter or damper in its adjusted position.

For the purpose of gaining more effective control of the air exhausted from the passenger compartment, the compartment formed by the pan member is divided into a plurality of chambers by means of upstanding wall members 54, 56, 58, and 60. Each of the upstanding wall members, as best shown in Fig. 3, preferably is a flanged sheet metal member having the flanged portion suitably secured, as by spot welding, to the inner surface of the bottom 28 and having elongated resilient members 62 similar to the members 36 engaging the inner surface of the outer panel member 16 for completely separating the chambers from each other.

The wall members 54, 56, 58, and 60 are so arranged that they form an independent chamber communicating with the passenger compartment through the openings 44 and communicating with the central exhaust openings 23 and 24. From an inspection of Fig. 1, it can be seen that the openings 46 independently communicate with the end exhaust openings 21, 22, 25 and 26.

By the separation of the exhaust compartment into the independent chambers, which independently communicate with the interior of the body through spaced openings and independently communicate with the exhaust openings, it has been found that more equal exhaustion of the air from the passenger compartment is obtained.

For the purpose of controlling the direction of flow and the distribution of the fresh air injected into the vehicle through the opening or openings 20, a unitary sheet metal member 64 of a shape defined by edges 65, 66, 67, 68, 69, 70, 71, and 72, in Fig. 1, is provided and mounted in the roof of the vehicle in a manner to be described in detail. Those edges of the sheet metal member connecting the edges 68 and 69 and 70, respectively, are indicated at 74 in Fig. 3.

The front edge 69 of the member 64 is suitably secured to the upper frame structure 76 of the vehicle transversely of the opening 20; and the side edges 74 are suitably secured to the longitudinally extending lintel bars 44. The edges 65, 66, the greater portion of 67, 72, and the greater portion of 71, are suitably secured to the under surface of the bottom 28 of the pan member, and the remaining portions of the member 64 are suitably secured to the upper roof panel. The connections between the edges of the member 64 and the vehicle body and pan member are substantially air-tight so that the space between the member 64 and the roof panel is separated from the interior of the vehicle and air cannot penetrate into the passenger compartment except by the control means which are to be described hereinafter.

It can be seen from the drawing that the member 64 in its association with the other members above described forms an air injector or inlet chamber having a transverse front portion in communication with the injector opening, or openings, 20 and having side portions which extend longitudinally of the vehicle at each side thereof substantially co-extensive with the side portions of the vehicle roof. The sheet member 64 may be described as having a transverse front portion 78 with longitudinally extending side portions 80, the portion 78 sloping downwardly and forwardly and the side portions 80 sloping downwardly and outwardly as indicated in Figs. 2 and 3. The side portions 80 may be curved as indicated in Fig. 3, so that the usual interior appearance of the vehicle is not disturbed.

Longitudinally extending openings 82, 83, 84, and 85 are provided through the side portions 80 of the member 64 for communicating the injector or intake openings with the passenger compartment. In the embodiment illustrated, two spaced openings are provided at each side of the vehicle so that air introduced into the interior of the body may be properly distributed, but it is to be understood that this number may be varied within the scope of the present invention.

By injecting air into the passenger compartment adjacent points from which the air is independently exhausted therefrom, it has been found that more effective and proper ventilation of the passenger compartment is obtained.

Suitable shutter or damper control means, such as those shown in Fig. 2 for the exhaust openings, are provided for each of the intake openings 82, 83, 84, and 85 respectively. It is to be understood that other types of control means may be used within the scope of the present invention.

In order to finish the interior appearance of the vehicle, head lining 88, having openings therein corresponding to the intake and exhaust openings into the passenger compartment, is fixed in place within the passenger compartment in the usual manner.

Formal changes may be made in the specific embodiment of the invention described without departing from the spirit and substance of the invention, the scope of which is commensurate with the appended claims.

What is claimed is:

1. Apparatus for ventilating the interior of a closed vehicle body comprising means forming a plurality of transversely extending exhaust openings in the roof of said vehicle, means forming a compartment extending longitudinally of said roof substantially co-extensive with the upper portion of said roof in communication with said exhaust openings, said compartment having spaced openings communicating with the interior of said body adjacent the front and rear portions thereof, and means separating said compartment into a plurality of independent chambers, those of said last named openings communicating with the interior of said body adjacent the front being in communication with one of said chambers and the other of said openings being in communication with the other of said chambers, the construction and arrangement of said chambers relative to said exhaust openings being such that said chambers are in independent communication with different of said exhaust openings.

2. Apparatus for ventilating the interior of a closed vehicle body having an outer roof panel and a windshield comprising means forming a plurality of transversely aligned exhaust openings in the outer roof panel adjacent the front thereof, a unitary pan member extending longitudinally of said roof substantially co-extensive with the upper portion of said roof and cooperating with the outer roof panel to form a first compartment, said pan member having forward and rear openings therethrough communicating with the interior of said body adjacent the front and rear portions thereof, respectively, and means separating said compartment into a plurality of independent chambers, one of said chambers being in communication with the interior of said body through said forward openings, and being in communication with certain of said exhaust openings, and another of said chambers being in communication with the interior of said body through said rear openings and being in communication with the other of said exhaust openings.

3. Apparatus for ventilating the interior of a closed vehicle body having an outer roof panel and a windshield comprising means forming injector openings through said outer roof panel immediately above and transversely of said windshield, means forming a plurality of transversely aligned exhaust openings in the outer roof panel adjacent the front thereof, a unitary pan member extending longitudinally of said roof substantially co-extensive with the upper portion of said roof and cooperating with the outer roof panel to form a first compartment, said pan member having forward and rear openings therethrough communicating with the interior of said body adjacent the front and rear portions thereof, means separating said compartment into a plurality of independent chambers, one of said chambers being in communication with the interior of said body through said forward opening and being in communication with certain of said exhaust openings, and another of said chambers being in communication with the interior of said body through said rear openings and being in communication with the other of said exhaust openings, a unitary sheet metal member having a transverse front portion adjacent said injector openings and having side portions extending longitudinally of said vehicle and cooperating with the side portions of said roof panel to form a second compartment in communication with said intake openings, said side portions having openings therethrough communicating with the interior of said vehicle body, and means to control the flow of air through the openings communicating the intake and exhaust chambers with the interior of the body.

4. Apparatus for ventilating the interior of a closed vehicle body having an outer roof panel and a windshield comprising means forming central and end transversely aligned exhaust openings in the outer roof panel adjacent the front thereof, a unitary pan member extending longitudinally of said roof substantially coextensive with the upper portion of said roof and cooperating with the outer roof panel to form a first compartment, said pan member having forward and rear openings therethrough communicating with the interior of said body adjacent the front and rear portions thereof, and means separating said compartment into a plurality of independent chambers, one of said chambers being in communication with the interior of said body through said forward openings and being in communication with said central exhaust openings, and another of said chambers being in communication with the interior of said body through said rear openings and being in communication with said end exhaust openings.

5. Apparatus for ventilating the interior of a closed vehicle body having an outer roof panel and a windshield comprising means forming a plurality of exhaust openings in the outer roof panel, a unitary pan member extending longitudinally of said roof substantially coextensive with the upper portion of said roof to form a first compartment, said pan member having a plurality of openings therethrough communicating with the interior of said body, and means separating said compartment into a plurality of independent chambers, one of said chambers being in communication with the interior of said body through one of said openings through said pan member and being in communication with certain of said exhaust openings, and another of said chambers being in communication with the interior of said body through other of said openings through said pan member and being in communication with the other of said exhaust openings.

6. Apparatus for ventilating the interior of a closed vehicle body having an outer roof panel and a windshield comprising means forming a plurality of transversely aligned exhaust openings in the outer roof panel adjacent the front thereof, a unitary pan member extending longitudinally of said roof substantially coextensive with the upper portion of said roof and cooperating with the outer roof panel to form a first compartment, said pan member having forward and rear openings therethrough communicating with the interior of said body adjacent the front and rear portions thereof, and wall members forming an independent chamber communicating said forward openings with certain of said exhaust openings, said rear openings being in communication with the other of said exhaust openings.

JOHN N. H. CHRISTMAN.